Patented Nov. 28, 1950

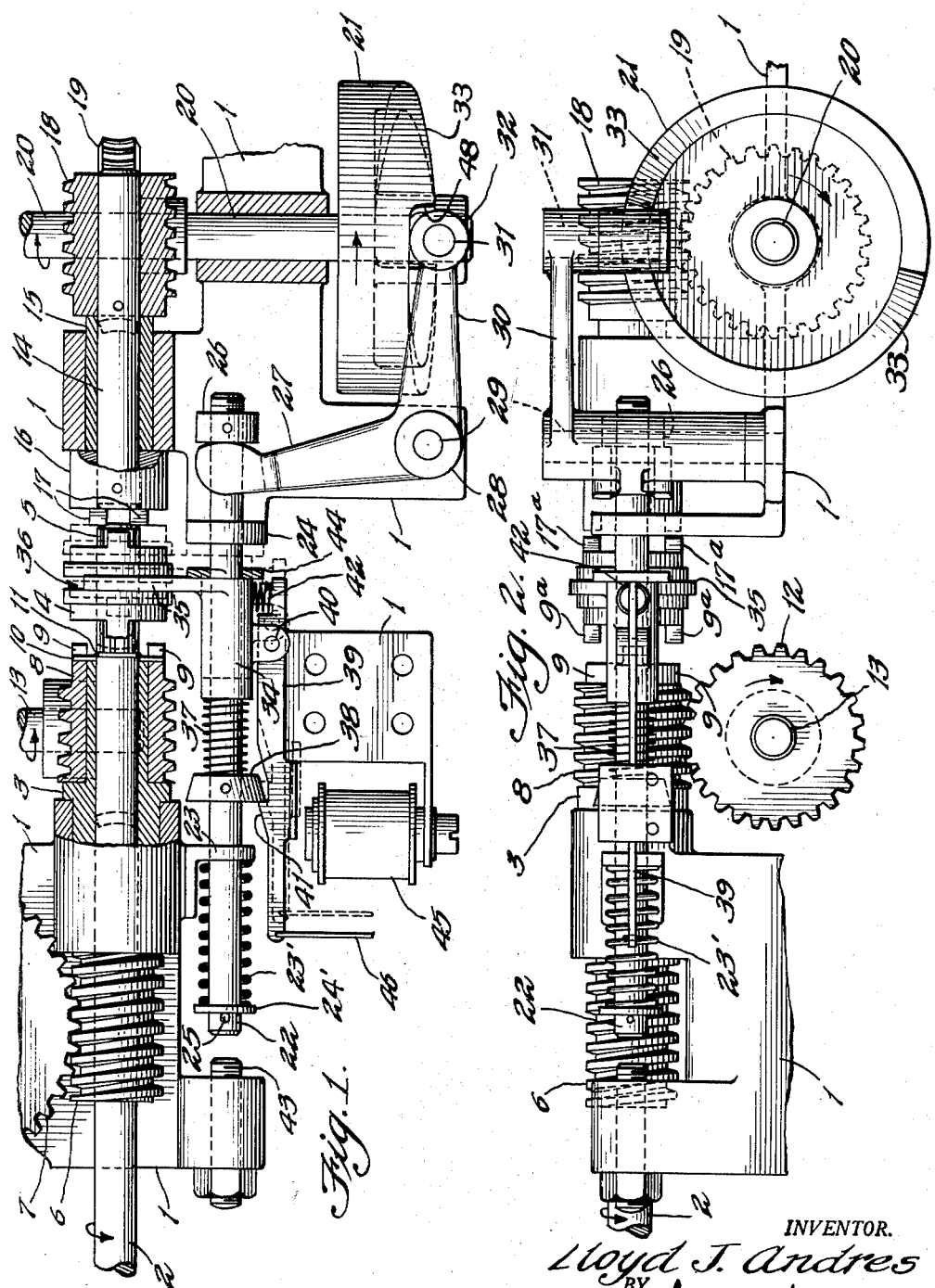

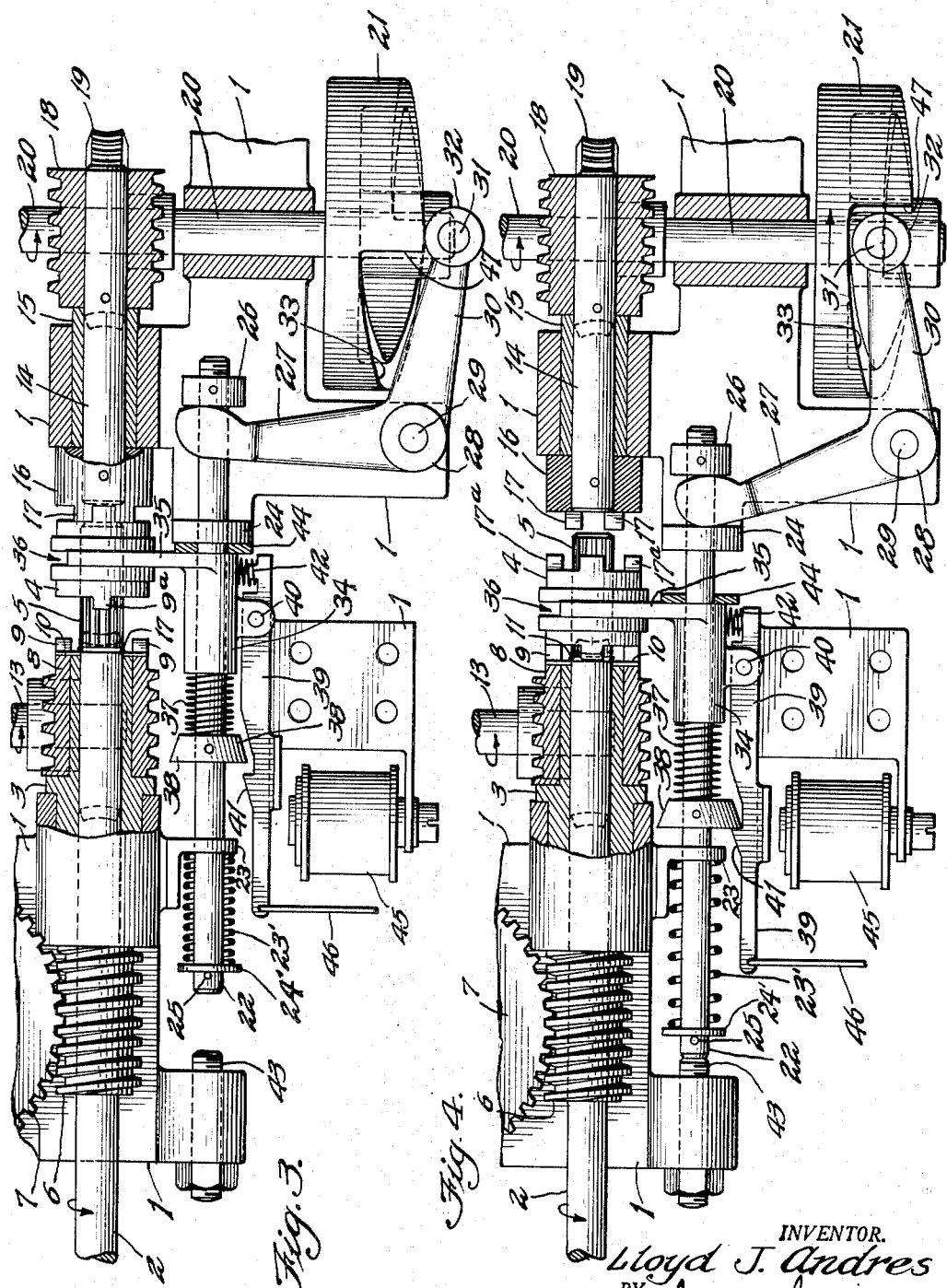

2,532,266

UNITED STATES PATENT OFFICE 2,532,266

CLUTCH AND CONTROL MECHANISM THEREFOR

Lloyd J. Andres, Itasca, Ill., assignor, by mesne assignments, to H. C. Evans & Company, Chicago, Ill., a corporation of Illinois Application August 12, 1946, Serial No. 689,945

10 Claims. (Cl. 192—82)

This invention relates to mechanical clutches and more particularly to an automatic clutch and control means therefor whereby a plurality of independent shafts may be intermittently driven from a single drive shaft in desired sequence and timed relationship, with provision, if desired, for rotation of the movable clutch member at times in neutral position.

An important object of the invention is the provision in apparatus of this character of simple and efficient mechanism for shifting said movable clutch member from one position to another by the use of energy temporarily stored in the mechanism, and also of very sensitive means operable by extremely small forces for initiating the action of said mechanism.

Another object is the provision of relatively simple and inexpensive means for timing the action of said clutch-shifting mechanism, thereby properly timing the operation of said driven shafts.

The apparatus provided by the invention is well adapted for use in automatic phonographs in which the record selecting, transferring and playing operations require sequential and timed operation of independent driven shafts, but it is not to be regarded as limited to this purpose.

Other objects and advantages of the invention will be apparent from the following description taken in connection with the accompanying drawings, in which:

Fig. 1 is a plan view, partially in section, of an apparatus in which my invention is embodied, the movable clutch member being shown in neutral position;

Fig. 2 is an elevational view thereof;

Fig. 3 is a view similar to Fig. 1, showing the movable clutch member in one of its operative positions; and Fig. 4 is a similar view showing the movable clutch member in the other of its operative positions.

The apparatus, as shown, is supported upon a framework 1, which is fragmentarily shown in the several figures of the drawings. A driving shaft 2 is mounted for rotation in suitable bearings in said framework and has a bushing 3 mounted thereon intermediate its ends. A clutch member 4 is slidably mounted on the inner end of said shaft 2 which is splined as indicated at 5.

The shaft 2 is adapted to be driven by a motor or other suitable source of power (not shown) and has a worm gear 6 affixed thereto meshing with a worm wheel 7 by which a part of the controlled mechanism may be driven. In case the clutch mechanism is used in conjunction with an automatic phonograph, worm wheel 7 may be connected to drive the record turntable of the phonograph.

The movable clutch member 4 has a pair of radially disposed dogs 9a and 17a projecting from opposite ends thereof as shown clearly in Fig. 2. A worm gear 8 is journaled for rotation on the bushing 3, being retained in place by a washer 10 and a snap ring 11 on the shaft 2. Said worm gear 8 has a pair of oppositely positioned dogs 9—9 on one end thereof adapted to be engaged by the dogs 9a on the movable clutch 4 whereby said worm gear 8 may be rotated when said clutch member is in the position shown in Fig. 4. Said worm gear 8 meshes with a worm wheel 12 on a shaft 13 (see Fig. 2) which shaft is driven in the direction indicated by the arrows when said worm gear 8 is connected to the drive shaft by means of the clutch member 4. While this driven shaft may be used to operate any suitable mechanism, in the case of an automatic phonograph it is adapted for operation of a record selecting mechanism whereby a record magazine is brought to proper position for engagement by the transfer mechanism of a selected record.

A shaft 14 is positioned in alignment with the shaft 2 and is journaled for rotation in a bushing 15 in a part of the frame 1. The inner end of said shaft 14 is spaced a short distance from the splined end 5 of the shaft 2 and carries a clutch member 16 which is pinned or otherwise rigidly secured thereto. A pair of oppositely disposed dogs 17—17 project from the inner end of said clutch member 16, being adapted to be engaged by the dogs 17a on the clutch member 4 when the latter is in the position shown in Fig. 3.

A worm gear 18 is secured to said shaft 14 and meshes with a worm wheel 19 secured to a shaft 20 on one end of which there is mounted an annular cam 21. The opposite end of said shaft 20 is shown as broken away in the drawings but in practice any suitable mechanism which is to be operated independently of the mechanism operated by the shaft 13 may be operated thereby. In the case of an automatic phonograph the record transfer mechanism above mentioned could be operated from said shaft 20.

For movement of the clutch member 4 to its respective operative positions I employ a control mechanism including a shaft 22 supported in brackets 23, 24, on the framework 1, said shaft being slidably mounted in said brackets and being movable lengthwise in direction parallel to the axis of the shaft 2. A coil spring 23' is mounted on one end of the shaft 22 between the bracket 23 and a washer 24' retained on the end of said shaft 22 by a pin 25. Said spring 23' tends to urge the shaft 22 toward the left as viewed in the drawings.

An adjustable collar 26 is threaded onto the opposite end of said shaft 22, to which it may be fixedly secured by a pin or set screw if desired, and serves as a bearing point for an arm 27 of a bell crank lever 28 which is pivotally mounted on a pin 29 in the frame 1. The other arm 30 of said bell crank carries at its end a roller 32 secured thereto by a pin 31, said roller being in contact with the working face 33 of the cam member 21. Said working face is of generally sloping contour, with a cut-back from the high to the low point, as indicated at 47 (see Figs. 3 and 4), and a cut-back to an intermediate position, as indicated at 48 (see Fig. 1).

A yoke member 34 is slidably mounted on the shaft 22 and has a fork 35 in engagement with a peripheral groove 36 in the slidable clutch member 4. Said yoke is urged toward the right, as viewed in the drawings, by a spring 37 coiled upon the shaft 22 and held between a collar portion of the yoke 34 and an abutment collar 38 fixed to said shaft.

A latch lever 39 having a shoulder 41 thereon is pivoted at 40 to projecting ears on the yoke 34 and is urged in direction toward the shaft 22 by means of a spring 42 retained between the body of said yoke member and an end of the latch lever 39 projecting beyond pivot point 40 of said lever.

An adjustable stop screw 43 is carried by the frame in axial alignment with the shaft 22 so as to accurately limit the movement of said shaft toward the left in such manner that the dogs 9a on the clutch member 4 will properly engage the dogs 9 on the worm gear 8 when said clutch member is shifted to the position shown in Fig. 4.

A resilient washer 44 is provided on the shaft 22 between the yoke 34 and the bracket 24 to serve as a bumper for the yoke when the latter is released and moved to the position shown in Fig. 3 as hereinafter described.

For the purpose of tripping the latch lever 39 and thereby disengaging the shoulder 41 thereon from the latch collar 38 on the shaft 22, I have shown an electromagnet 45 and an alternate mechanical pull rod 46. While although it will be understood that other suitable means might be used for tripping this latch, it will be noted that very slight force is required for this operation of the latch lever, which initiates the operation of the clutch mechanism in manner which will be later described.

The operation of the mechanism is as follows:

Assuming that the parts are in the position shown in Fig. 4, rotation of the shaft 2 in the direction indicated by the arrow will cause rotation of the worm wheel 8 which at that time is in engagement with the clutch member 4 and this will result in the driving of the shaft 13 which, as stated above, will operate the record selecting mechanism if the controlled mechanism is an automatic phonograph. Rotation of said shaft 2 of course, also drives the worm wheel 7 through the worm gear 6, with the result that in the case of the phonograph example above mentioned the record turntable will be rotated at all times while the shaft 2 is rotating.

After predetermined rotation of the shaft 13, as for example for such time as is necessary to bring a phonograph record magazine to the point where the selected record is to be gripped by the transfer mechanism, the latch lever 39 will be tripped by momentary energization of the electromagnet 45 or pulling of the rod 46. This exceedingly small force will move the latch 39 against the restraining action of the spring 42 and disengage the shoulder 41 from the abutment collar 38. The energy stored in the spring 37 will then move the yoke 34 and fork 35 toward the right to the position shown in Fig. 3. In this position the dogs 17a on said clutch member 4 will engage the dogs 17 on the clutch member 16 secured to the shaft 14 and said shaft will be thereafter rotated to transmit motion to the shaft 20 through the worm gear 18 and worm wheel 19. The said shaft 20 will then actuate the part of the controlled machine operatively connected thereto, as for example the record transfer mechanism of an automatic phonograph, and will cause rotation of the cam member 21.

It will be understood that at the moment of engagement of the clutch member 4 with the member 16, the bell crank 28 will be in the position shown in Fig. 4 with the roller 32 resting upon the lowermost surface of the cam face and with the shaft 22 in its extreme left position as shown in said figure. Therefore, while the clutch member 4 will be in the position shown in Fig. 3, the shaft 22 and collar 38 thereon will still be in the position shown in Fig. 4 until further rotation of the cam 21 moves them gradually from the position of Fig. 4 to that of Fig. 3. When the collar 38 has moved to the right past the shoulder 41 on the latch lever 39, the latter will move into position to engage said collar inasmuch as said lever 39 is urged toward the shaft 22 by action of the spring 42.

When the cam 21 has rotated to the position shown in Fig. 1, the roller 32 will fall over the cut-back 48 to the intermediate position shown in said Fig. 1, thus permitting the spring 23' to move the shaft 22 sufficiently to bring the member 4 to a neutral position in which it is not interengaged with either the clutch member 16 or the worm gear 8. Further rotation of the shaft 2 will continue to rotate the worm wheel 7 and the mechanism actuated thereby (in the case of a phonograph, a record turntable) while the shafts 13 and 20 are idle. After predetermined rotation, as for example to the point when the playing of a phonograph record has been completed, the latch 39 will again be tripped, as by energization of the electromagnet 45 and the spring 37 will cause the yoke 34 and clutch member 4 to again move to the right to effect operative engagement of the clutch member 4 with the clutch member 16. Rotation of the shaft 20 will thus be resumed causing the record transfer mechanism (in case the controlled machine is a phonograph) to restore the record to the record magazine and causing the cam 21 to continue its rotation. When the high point on said cam is reached, as shown in Fig. 3, further rotation of the cam will cause the roller 32 to fall over the cut-back 47 to the low point on the working face of the cam, whereupon the spring 23' will move the control shaft 22 and the yoke 34 to the position shown in Fig. 4, thus moving the slidable cam member 4 from the position of Fig. 3 to that of Fig. 4 in which it is operatively interconnected with the worm gear 8, thus completing the cycle of operation. It will be understood that at this point the motor by which the shaft 2 is driven may be deenergized by a suitable switch contained in the controlled machine or another cycle of operation may be immediately begun, depending, in the case of an automatic phonograph, upon whether a further record selection has been made prior to the completion of the first cycle.

It will be apparent that different cycles of operation may be obtained by modification of the form of cam 21 and by varying the time of tripping of the latch 39 and that these and other modifications of the specific form of the apparatus may be made without departing from the spirit and scope of the invention as defined in the appended claims.

I claim:

1. A clutch mechanism comprising a driving shaft, a plurality of independent driven shafts, a slidable clutch member arranged to be driven by said driving shaft and to be connected with said driven shafts, respectively, in predetermined sequence and timed order, and clutch control means including a shifter member operatively engaging said slidable clutch member, a control shaft on which said shifter member is slidably mounted, a spring on said control shaft for moving said shifter member lengthwise of the shaft to move said slidable clutch member into one of its operative positions, cam mechanism, operable by power derived from said driving shaft at predetermined stages in the operation of the mechanism, to compress said spring and store energy therein for subsequent operation of said shifter member, a latch for holding said spring under compression, and means operable by slight force for releasing said latch with a trigger action to cause said spring to actuate said shifter member and thereby move said slidable clutch member into said operative position.

2. A clutch mechanism comprising a driving shaft, a plurality of independent driven shafts, a slidable clutch member arranged to be driven by said driving shaft and to be connected with said driven shafts, respectively, in predetermined sequence and timed order, and clutch control means including a shifter member operatively engaging said slidable clutch member, a control shaft on which said shifter member is slidably mounted, springs on said control shaft arranged, respectively, to move said shifter member lengthwise of the shaft to move said slidable clutch member into its respective operative positions, cam mechanism, operable by power derived from said driving shaft at predetermined stages in the operation of the mechanism, to compress said springs and store energy therein for subsequent operation of said shifter member, a latch for holding one of said springs under compression, and means operable by slight force for releasing said latch with a trigger action to cause said spring to actuate said shifter member and thereby move said slidable clutch member into one of said operative positions.

3. A clutch mechanism comprising a driving shaft, a plurality of independent driven shafts, a slidable clutch member arranged to be driven by said driving shaft and to be connected with said driven shafts, respectively, in predetermined sequence and timed order, and clutch control means including a shifter member operatively engaging said slidable clutch member, a control shaft on which said shifter member is slidably mounted, springs on said control shaft arranged, respectively, to move said shifter member lengthwise of the shaft to move said slidable clutch member into its respective operative positions, cam mechanism, operable by power derived from said driving shaft at predetermined stages in the operation of the mechanism, to compress said springs and store energy therein for subsequent operation of said shifter member, a latch for holding one of said springs under compression, means operable by slight force for releasing said latch with a trigger action to cause said spring to actuate said shifter member and thereby move said slidable clutch member into one of said operative positions, and means whereby the other of said springs is at times released from compression by action of said cam mechanism permitting the energy stored therein to actuate said shifter member in the opposite direction and thereby move said slidable clutch member into another of its operative positions.

4. A clutch mechanism comprising a driving shaft, a plurality of independent driven shafts, a slidable clutch member arranged to be driven by said driving shaft and to be connected with said driven shafts, respectively, in predetermined sequence and timed order, and clutch control means including a shifter member operatively engaging said slidable clutch member, a control shaft on which said shifter member is slidably mounted, a spring on said control shaft for moving said shifter member lengthwise of the shaft to move said slidable clutch member into one of its operative positions, cam mechanism, operable by power derived from said driving shaft at predetermined stages in the operation of the mechanism, to compress said spring and store energy therein for subsequent operation of said shifter member, an abutment on said control shaft, a latch connected to said shifter member and engageable with said abutment for holding said spring under compression, and means operable by slight force for releasing said latch from said abutment with a trigger action to cause said spring to actuate said shifter member and thereby move said slidable clutch member into said operative position.

5. A clutch mechanism comprising a driving shaft, a plurality of independent driven shafts, a slidable clutch member arranged to be driven by said driving shaft and to be connected with said driven shafts, respectively, in predetermined sequence and timed order, and clutch control means including a shifter member operatively engaging said slidable clutch member, a control shaft on which said shifter member is slidably mounted, means by which said control shaft is slidably supported, a spring on said control shaft for moving said shifter member lengthwise of the shaft to move said slidable clutch member into one of its operative positions, cam mechanism, operable by power derived from said driving shaft at predetermined stages in the operation of the mechanism, to move said control shaft endwise and to thereby compress said spring and store energy therein for subsequent operation of said shifter member, an abutment on said control shaft, a latch connected to said shifter member and engageable with said abutment for holding said spring under compression, and means operable by slight force for releasing said latch from said abutment with a trigger action to cause said spring to actuate said shifter member and thereby move said slidable clutch member into said operative position.

6. A clutch mechanism comprising a driving shaft, a plurality of independent driven shafts, a slidable clutch member arranged to be driven by said driving shaft and to be connected with said driven shafts, respectively, in predetermined sequence an timed order, and clutch control means including a shifter member operatively engaging said slidable clutch member, a control shaft on which said shifter member is slidably mounted, means by which said control shaft is slidably supported, springs on said control shaft arranged, respectively, to move said shifter member lengthwise of the shaft to move said slidable clutch member into its respective operative positions, cam mechanism, operable by power derived from said driving shaft at predetermined stages in the operation of the mechanism, to move said control shaft endwise and to thereby compress said springs and store energy therein for subsequent operation of said shifter member, an abutment on said control shaft, a latch connected to said shifter member, an abutment on said control shaft, a latch connected to said shifter member and engageable with said abutment for holding one of said springs under compression, and means operable by slight force for releasing said latch with a trigger action to cause said spring to actuate said shifter member and thereby move said slidable clutch member into one of said operative positions.

7. A clutch mechanism comprising a driving shaft, a plurality of independent driven shafts, a slidable clutch member arranged to be driven by said driving shaft and to be connected with said driven shafts, respectively, in predetermined sequence and timed order, and clutch control means including a shifter member operatively engaging said slidable clutch member, a control shaft on which said shifter member is slidably mounted, means by which said control shaft is slidably supported, springs on said control shaft arranged, respectively, to move said shifter member lengthwise of the shaft to move said slidable clutch member into its respective operative positions, cam mechanism, operable by power derived from said driving shaft at predetermined stages in the operation of the mechanism, to move said control shaft endwise and to thereby compress said springs and store energy therein for subsequent operation of said shifter member, an abutment on said control shaft, a latch connected to said shifter member and engageable with said abutment for holding one of said springs under compression, means operable by slight force for releasing said latch with a trigger action to cause said spring to actuate said shifter member and thereby move said slidable clutch member into one of said operative positions, and means whereby the other of said springs is at times released from compression by action of said cam mechanism and is thereby caused to move said control shaft endwise in direction opposite to that of said first-mentioned endwise movement, said shifter member being movable with said control shaft in such movement to shift said slidable clutch member into another of its operative positions.

8. A clutch mechanism comprising a driving shaft, a plurality of independent driven shafts, a slidable clutch member arranged to be driven by said driving shaft and to be connected with said driven shafts, respectively, in predetermined sequence and timed order, and clutch control means including a shifter member operatively engaging said slidable clutch member, a control shaft on which said shifter member is slidably mounted, a spring on said control shaft for moving said shifter member lengthwise of the shaft to move said slidable clutch member into one of its operative positions, cam mechanism, operable by power derived from said driving shaft at predetermined stages in the operation of the mechanism, to compress said spring and store energy therein for subsequent operation of said shifter member, a latch for holding said spring under compression, and means for releasing said latch to cause said spring to actuate said shifter member and thereby move said slidable clutch member into said operative position.

9. A clutch mechanism comprising a driving shaft, a plurality of independent driven shafts, a slidable clutch member arranged to be driven by said driving shaft and to be connected with said driven shafts, respectively, in predetermined sequence and timed order, and clutch control means including a shifter member operatively engaging said slidable clutch member, a control shaft on which said shifter member is slidably mounted, springs on said control shaft arranged, respectively, to move said shifter member lengthwise of the shaft to move said slidable clutch member into its respective operative positions, cam mechanism, operable by power derived from said driving shaft at predetermined stages in the operation of the mechanism, to compress said springs and store energy therein for subsequent operation of said shifter member, a latch for holding one of said springs under compression, and means for releasing said latch to cause said spring to actuate said shifter member and thereby move said slidable clutch member into one of said operative positions.

10. A clutch mechanism comprising a driving shaft, a plurality of independent driven shafts, a slidable clutch member arranged to be driven by said driving shaft and to be connected with said driven shafts, respectively, in predetermined sequence and timed order, and clutch control means including a shifter member operatively engaging said slidable clutch member, a control shaft on which said shifter member is slidably mounted, springs on said control shaft arranged, respectively, to move said shifter member lengthwise of the shaft to move said slidable clutch member into its respective operative positions, cam mechanism, operable by power derived from said driving shaft at predetermined stages in the operation of the mechanism, to compress said springs and store energy therein for subsequent operation of said shifter member, a latch for holding one of said springs under compression, means for releasing said latch to cause said spring to actuate said shifter member and thereby move said slidable clutch member into one of said operative positions, and means whereby the other of said springs is at times released from compression by action of said cam mechanism permitting the energy stored therein to actuate said shifter member in the opposite direction and thereby move said slidable clutch member into another of its operative positions.

LLOYD J. ANDRES.

REFERENCES CITED

The following references are of record in the file of this patent:

UNITED STATES PATENTS

| Number | Name | Date |
|---|---|---|
| 723,593 | Ensign | Mar. 24, 1903 |
| 1,210,969 | Niedergesaess | Jan. 2, 1917 |
| 1,666,275 | Walsh | Apr. 17, 1928 |
| 1,704,602 | Harney | Mar. 5, 1929 |
| 1,765,527 | Gollnick | June 24, 1930 |
| 1,944,994 | Nepple | Jan. 30, 1934 |
| 1,982,925 | Quinn | Dec. 4, 1934 |
| 2,368,987 | Henschker | Feb. 6, 1945 |
| 2,450,048 | Knott | Sept. 28, 1948 |